(12) United States Patent
Roux et al.

(10) Patent No.: US 12,275,667 B2
(45) Date of Patent: Apr. 15, 2025

(54) GLASS-CERAMIC ARTICLE

(71) Applicant: EUROKERA S.N.C., Chateau-Thierry (FR)

(72) Inventors: Nicolas Roux, Chateau-Thierry (FR); Caroline Faillat, Belleau (FR); Amélie Bontemps, Mezy-Moulins (FR); Thibault Guedon, Paris (FR)

(73) Assignee: EUROKERA S.N.C., Chateau Thierry (FR)

( * ) Notice: Subject to any disclaimer, the term of this patent is extended or adjusted under 35 U.S.C. 154(b) by 1009 days.

(21) Appl. No.: 16/967,772

(22) PCT Filed: Feb. 18, 2019

(86) PCT No.: PCT/FR2019/050362
§ 371 (c)(1),
(2) Date: Aug. 6, 2020

(87) PCT Pub. No.: WO2019/158882
PCT Pub. Date: Aug. 22, 2019

(65) Prior Publication Data
US 2021/0188701 A1    Jun. 24, 2021

(30) Foreign Application Priority Data
Feb. 19, 2018 (FR) .................................... 1851396

(51) Int. Cl.
*C03C 17/02*   (2006.01)
*F24C 15/10*   (2006.01)

(52) U.S. Cl.
CPC ............. *C03C 17/02* (2013.01); *F24C 15/10* (2013.01); *C03C 2217/77* (2013.01); *C03C 2217/78* (2013.01)

(58) Field of Classification Search
CPC .... C03C 8/00; C03C 8/02; C03C 8/04; C03C 8/06; C03C 8/08; C03C 8/10; C03C 8/12; C03C 8/14; C03C 8/16; C03C 8/20; C03C 3/064; C03C 3/066; C03C 3/091; C03C 3/093; C03C 3/089; C03C 10/00; C03C 14/00; C03C 17/00; C03C 17/02; C03C 17/04; C03C 2214/16; C03C 2217/452; C03C 2217/485; C03C 2217/77; F24C 15/10

USPC ........................................................ 428/325
See application file for complete search history.

(56) References Cited

U.S. PATENT DOCUMENTS

| 5,326,728 | A | 7/1994 | Boury et al. |
| 5,633,090 | A | 5/1997 | Rodek et al. |
| 6,517,943 | B1 | 2/2003 | Beunet et al. |
| 2003/0148868 | A1 | 8/2003 | Beunet et al. |
| 2005/0090376 | A1 | 4/2005 | Beunet et al. |
| 2007/0265154 | A1* | 11/2007 | Baldwin .................. C03C 8/22 501/16 |
| 2008/0063876 | A1* | 3/2008 | Sakoske .................. C03C 8/04 428/432 |
| 2012/0263957 | A1 | 10/2012 | Chopinet et al. |
| 2014/0178642 | A1* | 6/2014 | Milanovska ............ F24C 15/10 428/149 |
| 2016/0244356 | A1 | 8/2016 | Lecomte et al. |
| 2019/0185370 | A1* | 6/2019 | Cheng ..................... C03C 3/064 |

FOREIGN PATENT DOCUMENTS

| EP | 2759524 A1 * | 7/2014 | ............. C03C 10/00 |
| EP | 1672036 B1 * | 12/2016 | ........... A61K 8/0266 |
| FR | 2701473 A1 | 8/1994 | |
| FR | 2732960 A1 | 10/1996 | |
| FR | 2782318 A1 | 2/2000 | |
| FR | 2826955 A1 | 1/2003 | |
| FR | 2954938 A1 | 7/2011 | |
| FR | 3012130 A1 | 4/2015 | |

OTHER PUBLICATIONS

International Search Report issued May 13, 2019 in PCT/FR2019/050362 filed Feb. 18, 2019 (with English translation), 7 pages.

* cited by examiner

*Primary Examiner* — Tri V Nguyen
(74) *Attorney, Agent, or Firm* — Element IP, PLC

(57) ABSTRACT

The present invention relates to a glass-ceramic article comprising at least one substrate, such as a plate, made of glass-ceramic, said substrate being coated in at least one area with at least one enamel coating such that:
1) the enamel has a gloss at 60° of less than 40,
2) the coverage rate of said enamel in said area coated with said coating is 40 to 80%,
3) said enamel comprises pigments in the form of mica and/or aluminum oxide and/or silica particles coated with metal oxides or combinations of metal oxides,
4) said enamel has a roughness Ra greater than or equal to 0.4 µm,
5) said enamel has a roughness Rt greater than 4 µm.

20 Claims, No Drawings

GLASS-CERAMIC ARTICLE

The present invention relates to the field of glass-ceramics. More precisely, it relates to an article, or a product, made of glass-ceramic, in particular a glass-ceramic plate intended to serve as a furniture surface and/or a cooking surface. The term glass-ceramic article or article made of glass-ceramic means an article based on a substrate (such as a plate) made of glass-ceramic material, said substrate which can, if need be, be provided with accessories or additional decorative or functional elements required for its end use, the article which can designate both the substrate alone and that provided with additional equipment (for example a cooktop provided with its control panel, heating elements, etc.).

A glass-ceramic is originally a glass, referred to as precursor glass or green-glass, the specific chemical composition of which makes allows controlled crystallization to be induced by means of suitable heat treatments, known as ceramization. This specific, partly crystallized structure gives glass-ceramics unique properties.

There are currently different types of glass-ceramic plates, each variant being the result of extensive studies and numerous tests, as it is very difficult to modify these plates and/or their production process without risking an adverse effect on the desired properties: in particular, to be able to be used as a cooktop, a glass-ceramic plate must generally have a transmittance in the wavelengths of the visible range which is both sufficiently low to mask at least some of the underlying heating elements when not in use and sufficiently high so that, depending on the case (radiant heating, induction heating, etc.), the user can, for safety purposes, see the heating elements in working order; it must also have a high transmittance in the wavelengths of the infrared range in the particular case of plates with radiant burners. Glass-ceramic plates must also have sufficient mechanical strength as required in their field of use. In particular, in order to be used as a cooktop in the field of household appliances or as a furniture surface, a glass-ceramic plate must have good resistance to pressure, impact (support and dropping of utensils, etc.), etc.

The most common glass-ceramic cooktops are dark in color, in particular black or brown or orange-brown in color, but there are also plates with a lighter-looking appearance (in particular white in color, for example with a haze of at least 50% as described in patent FR2766816), and transparent plates generally with opacifying coatings or with filters for special color effects.

Traditionally, glass-ceramic plates are used as cooktops, or they can also be associated with heating elements in other applications, for example to form fireplace inserts. Recently, their use has expanded to other areas of everyday life: glass-ceramic plates can be used as furniture surfaces, for example to form worktops, central islands, consoles, etc., the surface area they occupy in these new applications being greater than in the past. Depending on their use, they may be equipped with buttons, tactile areas, switches or other controls, their surface being in all cases (even in the case of a simple furniture surface) subject to multiple contacts related to their use, generally resulting in the appearance of unsightly fingerprints at the places of contact, leading to repeated cleaning as needed, particularly when the plates are dark and shiny. Such marks or soiling can also interfere with other possible components (heating elements, light sources, displays, etc.) of the glass-ceramic product.

To avoid fingerprints on product surfaces, it is known in other fields (for example in the field of glass window screens) to apply hydrophobic coatings (which repel water) and oleophobic coatings (which repel oil) to limit the amount of liquid(s) (water, sebum) deposited when in contact with the finger. However, such coatings, which must be applied over the entire surface to be protected, are not thermally resistant, which poses problems for cooktop-type applications.

It is also known to texture the glass surface of products to limit the visibility of fingerprints. However, the textures generally used are fragile and have poor resistance to mechanical stress (cleaning, abrasion).

In the field of glass-ceramics, existing textures or coatings are not generally suitable for systematically remedying fingerprint problems. The most frequently used coatings are above all coatings chosen to resist high temperatures, such as enamels, used locally to form decorative patterns or to indicate heating areas, for example, or paints used rather flat as opacifiers. However, these conventional coatings generally do not prevent fingerprints from the handling and use of the coated substrates, the enamels can also locally reduce the mechanical resistance of glass-ceramic plates and flake off, and paints are not suitable for all the heating modes for cooktops because of their lower resistance, particularly thermal resistance. It is also known to use other coatings based in particular on thin metallic layers deposited flat on a large part of the surface of the substrate, but such layers sometimes, on the contrary, contribute to the problems of fingerprints.

The present invention has therefore sought to develop improved glass-ceramic products which limit the visibility of fingerprints on their surface, in particular new glass-ceramic plates for use with one or more heating elements such as cooktops, or intended to serve as a furniture surface, these plates having anti-fingerprint properties, without negatively affecting the other properties sought for their use, in particular without negatively affecting their ease of maintenance and cleaning, nor their resistance, in particular their mechanical, scratch and abrasion resistance and, if need be, appropriate thermal resistance, and without being detrimental to their service life, while making sure to propose a simple and, if possible, flexible solution allowing the presence of additional decorations or functions as required.

This goal is achieved by means of the glass-ceramic product developed according to the invention in which the visibility of surface fingerprints is reduced by applying a specific enamel coating, said coating and said enamel being selected according to precise criteria in order to obtain the desired anti-fingerprinting effect. Indeed, the inventors have demonstrated that by choosing an enamel and applying it according to the criteria listed below, the anti-fingerprint effect was visibly obtained for different types of glass-ceramic substrates (more or less dark or with different compositions, etc.), while maintaining a certain flexibility in the composition of the enamel (to obtain different colors, for example) as long as the enamel and the deposited coating remain within the limits defined below.

The present invention therefore relates to a new glass-ceramic article, comprising at least one substrate, such as a plate, made of glass-ceramic, said substrate being coated in at least one area with at least one enamel coating (or deposition or layer of enamel) such that:
1) said enamel has a gloss (or degree of gloss) at 60° of less than 40,
2) the coverage rate of said enamel (or of said enamel coating) in said area coated with said coating is 40 to 80%, 3) said enamel comprises pigments in the form of mica and/or aluminum oxide and/or silica particles coated with metal oxides or combinations of metal oxides,
4) said enamel has a roughness Ra greater than or equal to 0.4 µm,
5) said enamel has a roughness Rt greater than 4 µm.

The enamel coating thus selected and applied generates in the coated area of said coating a reduction in the visibility of fingerprints, or in other words confers on said area anti-fingerprint properties (or functionality).

The glass-ceramic article (or product) according to the invention is in particular a cooktop or any piece of furniture (or comprising, or formed of) at least one substrate of glass-ceramic (material) (the substrate being most commonly in the form of a plate, which is integrated or mounted in the piece of furniture and/or combined with other elements to form the piece of furniture), said substrate which can, if need be, have display areas (in combination for example with light-emitting sources) or decorated areas or be combined with heating elements. In its most common application, the article according to the invention is intended to serve as a cooktop, this plate being generally intended to be integrated in a hotplate or stove comprising heating elements, for example radiant or halogen burners or induction heating elements. In another advantageous application, the article according to the invention is a glass-ceramic worktop or a central island, if need be with different displays and without necessarily cooking areas, or a console-type piece of furniture (the substrate forming for example the upper part), etc.

The substrate (or the article according to the invention itself if it is formed only from the substrate) is generally (in the form of) a plate, intended in particular for use with, in particular to cover or receive, at least one light source and/or heating element or intended to serve as a furniture surface. This substrate (or respectively this plate) is generally geometrically shaped, in particular rectangular, or square, or circular or oval, etc., and generally has one side facing the user in the position of use (or visible or outer side, generally the top side in the position of use), another side generally hidden, for example in a furniture frame or cabinet, in the position of use (or inner side, generally the bottom side in the position of use), and an edge (or thickness). The upper or outer side is generally flat and smooth but also locally have at least one raised area and/or at least one recessed area and/or at least one opening and/or beveled edges, such variations in shape constituting in particular continuous variations of the plate. The bottom or inner side may also be flat and smooth or provided with pins.

The thickness of the glass-ceramic substrate is generally at least 2 mm, in particular at least 2.5 mm, and is advantageously less than 15 mm, in particular is of the order of 3 to 15 mm, in particular of the order of 3 to 8 mm or of the order of 3 to 6 mm. The substrate is preferably a planar or quasi-planar plate (in particular with a deflection of less than 0.1% of the diagonal of the plate, and preferably of the order of zero).

The substrate can be based on any glass-ceramic, this substrate advantageously having a CTE of zero or almost zero, in particular less (in absolute value) than $30 \cdot 10^{-7} K^{-1}$ between 20 and 700° C., in particular less than $15 \cdot 10^{-7} K^{-1}$, or less than $5 \cdot 10^{-7} K^{-1}$ between 20 and 700° C.

The invention is more particularly directed to substrates with a dark appearance, low transmissivity and low diffusion, in particular based on any glass-ceramic having, intrinsically, a light transmittance LT below 40%, in particular below 5%, in particular of 0.2 to 2% for glass-ceramics up to 6 mm thick, and an optical transmittance (determined in a known way by calculating the ratio between the transmitted intensity and the incident intensity at a given wavelength) between 0.5 and 3% for a wavelength of 625 nm in the visible range. "Intrinsically" means that the substrate has such transmittance on its own, without the presence of any coating. Optical measurements are made according to standard EN 410. In particular, the light transmittance LT is measured according to standard EN 410 using illuminant D65, and is the total transmittance (in particular integrated in the visible range and weighted by the sensitivity curve of the human eye), taking into account both direct transmittance and possible diffuse transmittance, the measurement being made for example using a spectrophotometer equipped with an integrating sphere (in particular with the spectrophotometer marketed by the company Perkin Elmer under the name Lambda 950).

In particular, a substrate with a black or brown appearance is used, which, in combination with light sources placed beneath, allows luminous areas or decorations to be displayed while masking any underlying elements. It can in particular be based on a black glass-ceramic comprising crystals of β-quartz structure within a residual vitreous phase, the absolute value of its coefficient of thermal expansion being advantageously less than or equal to $15 \cdot 10^{-7} K^{-1}$, or even to $5 \cdot 10^{-7} K^{-1}$, such as the glass-ceramic of the plates marketed under the name Kerablack+ by the company Eurokera. It may in particular be a glass-ceramic refined with arsenic of composition as described in patent application EP0437228 or U.S. Pat. No. 5,070,045 or FR2657079, or a glass-ceramic refined with tin, with an arsenic oxide content preferentially below 0.1%, for example of composition as described in patent application WO 2012/156444, or refined with sulfide(s) as described in patent application WO2008053110.

The present invention can also be applied in the case where the substrate is lighter, for example for a transparent substrate, coated if need be with an opacifying coating, generally of paint, on its bottom side, such as a plate marketed under the name Keralite® by the company Eurokera.

In accordance with the invention, the glass-ceramic substrate concerned is coated in at least one area (or at least one area of said substrate is coated), more particularly on the surface, on at least part of one side, advantageously on at least part of the side facing the user in the position of use and/or requiring a reduction in the visibility of fingerprints, generally the top or outer side in the position of use, or can even be coated on several areas on one or more sides, or even on the entirety of one or more sides.

It is coated with at least (or by at least) one enamel coating as defined according to the invention, i.e. with at least one enamel coating having (or selected and applied so as to have) the aforementioned features. The area coated with the enamel coating according to the invention is preferably (or preferably occupies an area) of at least 5 cm by 5 cm, in particular at least 10 cm by 10 cm, particularly at least 20 cm by 20 cm. The thickness of said enamel coating is preferentially between 1.5 µm and 3.5 µm.

As first indicated, the enamel is thus chosen so as to have a gloss (or a degree of gloss) at 60° of less than 40 (value expressed in "gloss units" or unitless), this gloss being measured with the spectro-guide 45-0 marketed by the company BYK Gardner, according to standard ISO 2813 on enamel deposited flat (with a coverage rate of 100%).

Gloss is the optical characteristic of a light-reflecting surface and is measured along an axis tilted with respect to the surface normal (here an axis of 60° with respect to the surface normal) of the enamel deposited flat. The enamel selected (by simple measurement of the gloss of the enamels tested and selection of those which meet the criterion) according to the invention thus has a gloss (or degree of gloss) at 60° according to standard ISO 2813 comprised between 0 and 40.

As also indicated in the second selection criterion, the coverage rate of the enamel or of the coating in the area (coated with said coating) for which the anti-fingerprint effect is sought and obtained according to the invention, is from 40 to 80% (or comprised between 40 and 80% inclusive), this rate being defined as the surface actually covered by the enamel divided by the surface of said area, the coverage rate being in practice measurable on any analysis surface of 15 by 10 mm in the area provided with the coating for which the anti-fingerprint effect is sought and obtained according to the invention, said area being at least 5 cm by 5 cm. The coverage rate is measured using an optical bench with a 1024-pixel camera with the product number SVS ECO267 marketed by the company SVS Vistek and backlighting by light-emitting diode (LED Backlight compact SBACKII 51×51 mm marketed by the company TPL Vision) placed under the sample for capturing the image and using the free ImageJ software for analysis of the image.

Preferably, the coverage rate of said enamel coating (in the area for which the anti-fingerprint effect is sought), is from 50% to 80%, particularly preferably from 55% to 80%, and in particular from 58% to 79%, particularly of the order of 59% or 60% to 75% or 76%.

The profile or pattern (mixture or alternation of covered and uncovered portions in the area on which the enamel coating has been deposited) of the enamel coating according to the invention is in particular, and advantageously, random and isotropic.

This coverage rate (which can be adjusted according to the method of deposition chosen, the enamel deposition being generally performed in the present invention by screen printing—a more or less covering screen printing screen can then be chosen—or enamel jet—a greater or lesser projection can then be chosen) combined with the choice of the other above-mentioned criteria produces particularly satisfactory and improved results (compared in particular with uncovered areas, or in comparison with areas that are more lightly or heavily coated, for example coated with a flat—continuous deposition—of said enamel, or in comparison with areas coated with a more glossy enamel) in terms of the anti-fingerprint effect on the desired areas.

The enamel coating selected is also a coating combining the above-mentioned features 3) to 5). Thus, the enamel (and the enamel coating) in particular comprises pigments:
  in the form of mica particles covered (or coated) with metal oxides or combinations of metal oxides, in particular mica particles coated with $TiO_2$ or coated with $Fe_2O_3$, or coated with a $TiO_2$—$Fe_2O_3$ combination or with a $TiO_2$—$SnO_2$ combination or with a $TiO_2$—$Fe_2O_3$—$SnO_2$ combination; and/or
  in the form of aluminum oxide ($Al_2O_3$) particles coated with metal oxides or combinations of metal oxides, in particular $Al_2O_3$ particles coated with a $TiO_2$—$SnO_2$ combination or with a $TiO_2$—$SnO_2$—$SiO_2$ combination; and/or
  in the form of silica particles coated with metal oxides or combinations of metal oxides, in particular silica particles coated with a $TiO_2$—$SnO_2$ combination or a $Fe_2O_3$—$ZrO_2$ combination;

or even any other "effect" pigments (i.e. metallic effect pigment(s) also called interference pigment(s) or pearlescent pigment(s), these pigments leading to a high reflection of the incident light, because they are not absorbent but reflective unlike conventional pigments), i.e. in other words the enamel coating (respectively the enamel) is an enamel coating (respectively an enamel) with a so-called "metallic" appearance.

The above-mentioned pigments are marketed, for example, among others, by Merck under the references Iriodin 120, 300, 500, 520, 9602 or Pyrisma T40-23, T81-23, M40-58, or Colorstream F10-00, T10-01 or T10-02, or Xirallic F60-25, T60-23 or T60-10.

Preferably, the proportion of pigments selected from the pigments in the form of mica and/or aluminum oxide and/or silica particles coated with metal oxides or combinations of metal oxides in the enamel composition in dry form is from 10 to 30% by weight of said composition, the enamel composition essentially consisting, in dry form, of a glass frit to which pigments are added if need be, a medium then being added to allow application of the coating, this medium then being removed during the heat treatment allowing the final coating to be produced (ceramization heat treatment of the plate or rework heat treatment).

It should be noted that the term particles also covers the terms flakes or plaques depending on the usual forms of the pigments concerned.

Preferably according to the invention, the enamel used further advantageously comprises (in the dry composition including the frit and the pigments) a proportion of $B_2O_3$ of less than or equal to 25%, in particular less than 20%, and preferentially less than 15%, in particular less than 10%, or even less than 6% by weight.

In combination with the choice of an enamel or an enamel coating having the above-mentioned pigments, the enamel coating must also have a roughness Ra greater than or equal to 0.4 μm and a roughness Rt greater than 4 μm (roughnesses of the enamel deposited flat (with a 100% coverage rate)).

The roughness Ra is a well-known roughness parameter and is the arithmetic mean roughness of the profile (arithmetic mean of the absolute values of the deviations between successive peaks and troughs), defined over an evaluation length, and the roughness Rt is the total height of the profile between the deepest trough and the highest peak on the evaluation length. The roughness Ra and the roughness Rt as considered here are measured according to ISO 4287 over an evaluation length of 4 mm using a Mitutoyo model SJ401 sensor.

Preferably, the roughness Ra is from 0.4 to 0.7 μm (or comprised between from 0.4 and 07 μm inclusive), and preferably, the roughness Rt is comprised between 4 and 8 μm.

This roughness of the enamel replaces any initial microroughness on the surface of the substrate.

It can be observed that the enamel coating selected according to the invention is devoid of hydrophobic character (the water contact angle on this coating being less than 90°) and devoid of oleophobic character (the diiodomethane contact angle on this coating being less than 90°).

It can also be observed that the area for which the anti-fingerprint effect is desired is coated with the selected enamel coating, without the need to carry out any preliminary treatment (for example dipping or priming), to obtain both good adhesion of the coating and the effect sought.

The substrate according to the invention may optionally be coated with other coatings or layers which have a functional and/or decorative effect, deposited in particular in areas other than the areas coated with the anti-fingerprint enamel, such as usual patterns based on other enamels or an opacifying paint layer on another part of the substrate, or one or more functional layers such as an anti-scratch layer, anti-overflow layer, opacifying layer, etc.

The article according to the invention may further comprise, associated or combined with the substrate, one or more light sources and/or one or more heating elements (such as one or more radiant or halogen elements and/or one or more atmospheric gas burners and/or one or more means of induction heating), generally placed on the bottom side of the substrate. The one or more sources may be integrated in or coupled to one or more display-type structures, to an electronic control strip with touch-sensitive keys and digital display, etc., and are advantageously formed by light-emitting diodes, more or less spaced, optionally associated with one or more optical guides.

The article can also be equipped with (or associated with) additional functional element(s) (frame, connector(s), cable(s), control element(s), etc.).

The invention has thus made it possible to develop a glass-ceramic product with a surface coated at the desired locations (for example on the areas most exposed to handling or soiling, such as control or display areas or heating areas, etc.) with a composition selected to obtain an anti-fingerprint effect, while respecting the constraints, in particular the thermal and mechanical constraints, specific to the use of said products, and while keeping glass-ceramic products long-lasting and easy to maintain. The solution according to the present invention thus makes it possible to obtain simply and economically, without complex operations (the coating which can be deposited by traditional enamel deposition techniques, such as silk-screen printing, as indicated below), in a long-lasting way and with great flexibility, areas with an anti-fingerprint effect in any desired area of the product, even when these areas are intended to be subjected to high temperatures. The article according to the invention has in particular a good thermal resistance compatible with the use of various types of heaters, and does not pose problems of maintenance, scratching or abrasion as indicated above. The article according to the invention does not in particular suffer thermal degradation at temperatures of 400° C. or higher, which can be reached in particular in applications such as use as cooktops.

The article according to the invention also has good adhesion of the coating to the glass-ceramic substrate (without the need for preliminary treatment of the substrate and/or the use of an adhesion promoter, a bond coat or a primer). In particular, this coating does not show any delamination after thermal shock (for example at around 600° C.) and is resistant to high temperatures. The coating also has good scratch resistance. The coated substrate can be easily cleaned and has a long service life.

The present invention also relates to a process for manufacturing the glass-ceramic article according to the invention, starting from a glass substrate (the green glass substrate to form the glass-ceramic substrate by ceramization), in which at least one coating of an enamel as selected according to the invention (meeting the criteria indicated above in the definition of the article according to the invention) is applied to at least one part of said glass substrate (green glass) before ceramization, then ceramization of the glass substrate (green glass substrate) thus coated is carried out, this ceramization then making it possible to obtain a glass-ceramic substrate at least partially (in at least one area) coated with at least one anti-fingerprint coating as described above.

Alternatively, the enamel coating can optionally be deposited on the already ceramized substrate and refired, for example in a tunnel kiln. In this case, at least one coating of an enamel as selected according to the invention is applied to at least part of a glass-ceramic substrate and the enamel is then fired for example at a temperature of the order of 850° C.

It should be recalled that the manufacture of glass-ceramic plates generally proceeds as follows: in a melting furnace, glass of the chosen composition is melted to form the glass-ceramic, then the molten glass is laminated into a standard ribbon or sheet by passing the molten glass between laminating rollers and the glass ribbon is cut to the desired dimensions. The plates thus cut are then ceramized in a manner known per se, the ceramization consisting in firing the plates according to the chosen thermal profile in order to transform the glass into the polycrystalline material called "glass-ceramic" whose coefficient of thermal expansion is nil or virtually nil and which resists a thermal shock which can go in particular up to 700° C. Ceramization generally comprises a step of gradual elevation of the temperature to the nucleation range, a step of traversing the nucleation interval (for example between 650 and 830° C.) in several minutes (for example between 5 and 60 minutes), an additional increase in temperature to allow crystal growth (ceramization in a range for example from 850 to 1000° C., with temperature maintained at the ceramization stage for several minutes (for example from 5 to 30 minutes) and then rapid cooling to room temperature.

The application or deposition, before ceramization, of the enamel coating on green glass can be carried out by any suitable and rapid technique for depositing enamels, the application preferably being by screen printing or enamel jet.

The coated substrate is then subjected to the ceramization heat treatment (at temperatures which can reach between 850 and 1000° C.) for a period of usually several tens of minutes, as described above.

If need be, the process also comprises a cutting operation (generally before ceramization), for example by water jet, mechanical scribing, etc., followed by a shaping operation (grinding, beveling, etc.).

The following examples illustrate but do not limit the present invention.

In these examples, 10 cm by 10 cm plaques of the same substrate made of a translucent black glass-ceramic, marketed as KeraBlack+ by Eurokera, were used, these plaques having a smooth top side and a bottom side with pins and a thickness of 4 mm, these plaques being coated according to the examples of different enamel coatings to be compared, the enamel coatings having been deposited by screen-printing on the green glass substrate to afford the translucent black glass-ceramic, and then said green glass substrate having been ceramized to afford the glass-ceramic.

Several impressions were then made on the enamel-coated areas and on the glass-ceramic as a reference. The following scoring was used, the higher the number the more visible the print, the highest score (4) being that of the reference (uncoated glass-ceramic): 0 corresponded to the absence of visible fingerprints, 1 corresponded to a print that is barely discernable, 2 corresponded to a print that could be made out by closer observation, 3 corresponded to a print that could be seen immediately but was less pronounced than that on the glass-ceramic, and 4 corresponded to a fingerprint identical to that on the glass-ceramic. These scores were attributed for each comparison by a 5-person panel, under the same conditions at each evaluation, per series of roughly 10 samples per enamel, at an angle of 60° to normal, on the same day of the application of the finger (unless otherwise stated), the scores attributed by the different people being then compared and averaged.

For the first comparisons, an enamel of the following composition was used: $Al_2O_3$: 12.5-13.4%; $Li_2O+Na_2O+K_2O$: 3.8-5.9%; $B_2O_3$: 18-19.8%, CaO+BaO+MgO: 1.7-2.3%, $ZrO_2$: 1.4-2%, mixture of mica particles coated with $TiO_2$, of mica particles coated with $Fe_2O_3$, and of mica particles coated with a combination $TiO_2$—$Fe_2O_3$—$SnO_2$ (pigments with metallic effect): 30%, the rest (to 100% by weight) being silica $SiO_2$, this enamel having a gloss (flat) of 26.3, a roughness Ra of 0.5 µm, and a roughness Rt of 4.5 µm, and being tested with different coverage rates, in a 2.5 µm thick coating. The coverage rates tested were respectively: 10%, 36%, 42%, 46%, 48%, 58%, 59%, 60%, 72%, 74%, 78%, 80% and 100%. Scores (averages) below 1 down to 0 were given for rates 42 to 80%, with the lowest scores and with the least dispersion being observed for rates ranging from 55 to 78%, with an optimum at 60%.

The enamel was then compared, at the same thickness (2.5 µm) and with an 80% coverage rate for each enamel tested, with a metallized enamel not in accordance with the invention having a gloss (flat) of 66, a roughness Ra of 0.2 µm, and a roughness Rt of 2.8 µm, of composition selected from the following composition: $Al_2O_3$: 15.2-16.2%; $Li_2O+Na_2O+K_2O$: 4.6-7.1%; $B_2O_3$: 21.8-24.1%, CaO+BaO+MgO: 2-2.8%, $ZrO_2$: 1.7-2.5%, Xirallic F60-25 pigments marketed by Merck (pigments with metallic effect): 15%, the rest (to 100% by weight) being silica $SiO_2$. The average score obtained was of the order of 2.

The enamel was then compared, at an 80% coverage rate and the same thickness as before, with a non-metallized enamel not in accordance with the invention having a gloss (flat) of 15.7, a roughness Ra of 0.3 µm, and a roughness Rt of 4.4 µm, of composition selected from the following composition: $Al_2O_3$: 5.4-6.5%; $Li_2O+Na_2O+K_2O$: 4.8-7.4%; $B_2O_3$: 3.6-5.4%, CaO+BaO+MgO: 17-20.3%, $ZrO_2$: 1-1.7%, ZnO: 5.9-7.4%, mixture of particles of $TiO_2$, of $Fe_2O_3$, of Fe—Cr—Co—Ni oxides, and of Al—Co oxides (pigments without metallic effect): 15%, the rest (to 100% by weight) being silica $SiO_2$. The average score obtained was of the order of 2.

The enamel was then compared, at an 80% coverage rate and the same thickness as before, with another metallized enamel according to the invention having a gloss (flat) of 38.4, a roughness Ra of 0.6 µm, and a roughness Rt of 4.6 µm, of composition selected from the following composition: $Al_2O_3$: 12.5-13.4%; $Li_2O+Na_2O+K_2O$: 3.8-5.9%; $B_2O_3$: 18.0-19.8%, CaO+BaO+MgO: 1.7-2.3%, $ZrO_2$: 1.4-2%, Colorstream F10-00 pigments marketed by Merck (pigments with metallic effect): 30%, the rest (to 100% by weight) being silica $SiO_2$. The average score obtained was of the order of 0.

The enamel was then compared, at an 80% coverage rate and the same thickness as before, with another metallized enamel according to the invention having a gloss (flat) of 37.6, a roughness Ra of 0.4 µm, and a roughness Rt of 6 µm, of composition selected from the following composition: $Al_2O_3$: 14.3-15.3%; $Li_2O+Na_2O+K_2O$: 4.3-6.7%; $B_2O_3$: 20.5-22.7%, CaO+BaO+MgO: 1.9-2.6%, $ZrO_2$: 1.6-2.3%, mixture of mica particles coated with $TiO_2$, of mica particles coated with $Fe_2O_3$, and of mica particles coated with a combination $TiO_2$—$Fe_2O_3$—$SnO_2$ (pigments with metallic effect): 20%, the rest (to 100% by weight) being silica $SiO_2$. The average score obtained was of the order of 0.

The enamel was then compared, at an 80% coverage rate and the same thickness as before, with a metallized enamel not in accordance with the invention having a gloss (flat) of 80, a roughness Ra of 0.2 µm, and a roughness Rt of 2.5 µm, of composition selected from the following composition: $Al_2O_3$: 16.1-17.2%; $Li_2O+Na_2O+K_2O$: 4.9-7.6%; $B_2O_3$: 23.1-25.5%, CaO+BaO+MgO: 2.2-3%, $ZrO_2$: 1.8-2.6%, Xirallic T60-10 pigments marketed by Merck (pigments with metallic effect): 10%, the rest (to 100% by weight) being silica $SiO_2$. The average score obtained was between 1 and 2.

The enamel coatings meeting the conditions according to the invention have shown anti-fingerprint properties as opposed to other coatings not meeting these conditions. Furthermore, there were no significant differences in scoring noted when the tests were performed 7 or 14 days after application of the fingers.

In addition, the substrate and the coatings obtained showed no delamination after a thermal shock of 620° C. and showed no degradation of appearance after 100 h at 580° C.

The articles according to the invention can in particular be used with advantage to make a new range of cooktops for stoves or hotplates or a new range of worktables, consoles, credenzas, central islands, etc.

The invention claimed is:
1. A glass-ceramic article, comprising:
   at least one substrate made of glass-ceramic, wherein said substrate is coated in at least one area with at least one enamel coating such that:
   1) said enamel has a gloss at 60° of less than 40;
   2) the coverage rate of said enamel in said area coated with said coating is 40 to 80%;
   3) said enamel comprises reflective pigments in the form of a mixture of mica particles coated with $TiO_2$, mica particles coated with $Fe_2O_3$, and mica particles coated with a $TiO_2$—$Fe_2O_3$—$SnO_2$ combination and/or aluminum oxide coated with metal oxides or combinations of metal oxides and/or silica particles coated with metal oxides or combinations of metal oxides;
   4) said enamel has a roughness Ra of 0.4 µm-0.7 µm; and
   5) said enamel has a roughness Rt of 4 µm-8 µm.
2. The glass-ceramic article as claimed in claim 1, wherein said substrate is based on a glass-ceramic having intrinsically a light transmittance LT under illuminant D65 of less than 40% and an optical transmittance between 0.5 and 3% for a wavelength of 625 nm.
3. The glass-ceramic article as claimed in claim 1, wherein the area coated with said enamel coating is at least 5 cm by 5 cm.
4. The glass-ceramic article as claimed in claim 1, wherein a profile or pattern of said enamel coating is random and isotropic.
5. The glass-ceramic article as claimed in claim 1, wherein said enamel comprises a proportion of $B_2O_3$ less than or equal to 25% by weight.
6. The glass-ceramic article as claimed in claim 1, wherein a thickness of said coating is between 1.5 µm and 3.5 µm.
7. The glass-ceramic article as claimed in claim 1, wherein said enamel coating is devoid of hydrophobic character and devoid of oleophobic character.
8. The glass-ceramic article as claimed in claim 1, wherein said area is coated with said enamel coating without preliminary treatment of said area.

9. The glass-ceramic article as claimed in claim 1, wherein said article or said substrate is a cooktop or a worktop or a central island or a console.

10. The glass-ceramic article as claimed in claim 1, wherein the area coated with said enamel coating is at least 10 cm by 10 cm.

11. The glass-ceramic article as claimed in claim 1, wherein the area coated with said enamel coating is at least 20 cm by 20 cm.

12. The glass-ceramic article as claimed in claim 1, wherein said area coated with said enamel coating is not primarily coated with a primer.

13. The glass-ceramic article as claimed in claim 1, wherein said enamel comprises reflective pigments in the form of a mixture of mica particles coated with $TiO_2$, mica particles coated with $Fe_2O_3$, and mica particles coated with a $TiO_2$—$Fe_2O_3$—$SnO_2$ combination.

14. The glass-ceramic article as claimed in claim 1, wherein said enamel comprises a reflective pigment in the form of aluminum oxide particles coated with a $TiO_2$—$SnO_2$ combination or with a $TiO_2$—$SnO_2$—$SiO_2$ combination.

15. The glass-ceramic article as claimed in claim 1, wherein said enamel comprises a reflective pigment in the form of silica particles coated with a $TiO_2$—$SnO_2$ combination or a $Fe_2O_3$—$ZrO_2$ combination.

16. The glass-ceramic article as claimed in claim 1, wherein said enamel comprises a reflective pigment in the form of aluminum oxide coated with metal oxides or combinations of metal oxides.

17. The glass-ceramic article as claimed in claim 1, wherein said enamel comprises a reflective pigment in the form of silica particles coated with metal oxides or combinations of metal oxides.

18. The glass-ceramic article as claimed in claim 1, wherein said coverage rate of said enamel in said area coated with said coating is 42 to 80%.

19. The glass-ceramic article as claimed in claim 1, wherein said coverage rate of said enamel in said area coated with said coating is 55 to 78%.

20. A process for manufacturing a glass-ceramic article as claimed in claim 1, the process comprising:

applying at least one enamel coating such that:
1) said enamel has a gloss at 60° of less than 40;
2) the coverage rate of said enamel in said area coated with said coating is 40 to 80%;
3) said enamel comprises reflective pigments in the form of a mixture of mica particles coated with $TiO_2$, mica particles coated with $Fe_2O_3$, and mica particles coated with a $TiO_2$—$Fe_2O_3$—$SnO_2$ combination and/or aluminum oxide coated with metal oxides or combinations of metal oxides and/or silica particles coated with metal oxides or combinations of metal oxides;
4) said enamel has a roughness Ra of 0.4 µm-0.7 µm; and
5) said enamel has a roughness Rt of 4 µm-8 µm;

either on at least part of a glass substrate and then performing ceramization of the glass substrate thus coated, or on at least part of a glass-ceramic substrate and then firing the enamel.

* * * * *